United States Patent
Drake (10) Patent No.: US 9,732,739 B2
(45) Date of Patent: Aug. 15, 2017

(54) CONCRETE PUMPING SYSTEM HAVING SAFETY RECIRCULATION AND METHOD FEATURES

(71) Applicant: Robert A Drake, Rocky River, OH (US)

(72) Inventor: Robert A Drake, Rocky River, OH (US)

(*) Notice: Subject to any disclaimer, the term of this patent is extended or adjusted under 35 U.S.C. 154(b) by 147 days.

(21) Appl. No.: 14/545,272

(22) Filed: Apr. 16, 2015

(65) Prior Publication Data

US 2016/0305411 A1     Oct. 20, 2016

(51) Int. Cl.
*F04B 15/00* (2006.01)
*F16K 1/32* (2006.01)
*F04B 15/02* (2006.01)

(52) U.S. Cl.
CPC ............ *F04B 15/00* (2013.01); *F04B 15/023* (2013.01); *F16K 1/32* (2013.01)

(58) Field of Classification Search
CPC .......... F04B 15/00; F04B 15/023; F16K 1/32; Y10T 137/85954; Y10T 137/87893; Y10T 137/2605; Y10T 137/8601; Y10T 137/264; Y10T 137/2594; Y10T 137/2579; Y10T 137/2597; B01F 15/0437
USPC ... 137/563, 885, 98, 115.01, 115.13, 565.14, 137/115.25, 115.03, 115.09, 115.1; 366/136–137, 51, 131, 27, 28, 29; 251/62–63.6; 417/900
See application file for complete search history.

(56) References Cited

U.S. PATENT DOCUMENTS

| | | | |
|---|---|---|---|
| 2,665,712 A * | 1/1954 | Pratt | F16K 35/10 137/269 |
| 3,672,628 A * | 6/1972 | Aanstad | F16K 31/1225 251/47 |
| 3,682,575 A | 8/1972 | Guddal et al. | 417/517 |
| 4,178,142 A | 12/1979 | Schwing | 417/516 |
| 5,114,319 A | 5/1992 | Faber | 417/342 |
| 5,180,294 A | 1/1993 | Watchorn | 417/516 |
| 5,293,903 A * | 3/1994 | Appelwick | E03C 1/023 137/887 |
| 5,374,119 A * | 12/1994 | Scheimann | B01F 1/00 137/268 |
| 5,460,301 A | 10/1995 | Ebinger et al. | 222/626 |
| 6,305,916 B1 | 10/2001 | Reinert | 417/454 |
| 6,484,752 B1 | 11/2002 | Ebinger et al. | 137/615 |
| 6,719,921 B2 * | 4/2004 | Steinberger | B01F 3/088 252/186.42 |
| 6,821,097 B2 | 11/2004 | Reinert | 417/517 |

(Continued)

*Primary Examiner* — Michael R Reid
(74) *Attorney, Agent, or Firm* — David A. Burge (57) ABSTRACT

Mixed concrete is pumped under pressure along a primary flow path to a typically lengthy supply line. In the event a clog, blockage or other supply line concern is detected, a branch conduit in communication with the primary flow path permits a portion or all of the pressurized flow to pass through a diverter valve and a recirculation conduit back into an open-to-atmosphere reservoir or hopper from which the concrete originally was pumped. The recirculation system of this invention permits supply line pressure to be safely regulated, diminished, relieved and jogged, all without there being any need to discharge or waste valuable mixed concrete, and without having to dangerously open one or more connections of a pressurized supply line.

20 Claims, 4 Drawing Sheets

(56) References Cited

U.S. PATENT DOCUMENTS

| | | | |
|---|---|---|---|
| 6,823,888 B1 * | 11/2004 | Raymond | E04G 21/04 |
| | | | 137/351 |
| 6,871,667 B2 | 3/2005 | Schwing et al. | 137/615 |
| 7,363,937 B2 * | 4/2008 | Suter | F16K 47/08 |
| | | | 137/375 |
| 7,462,020 B2 | 12/2008 | Reinert | 417/532 |
| 7,543,851 B2 | 6/2009 | Wolfram et al. | 280/766.1 |
| 8,123,504 B2 | 2/2012 | Lenhart | 417/519 |
| 8,439,657 B2 | 5/2013 | Drago | 417/532 |
| 8,469,333 B2 * | 6/2013 | Medina | F16K 31/1223 |
| | | | 251/282 |
| 2013/0180612 A1 | 7/2013 | Morrison | 137/886 |

* cited by examiner

CONCRETE PUMPING SYSTEM HAVING SAFETY RECIRCULATION AND METHOD FEATURES

BACKGROUND

The present invention relates to system for safely supplying pressurized mixed concrete from a concrete pump to a supply line that typically is lengthy—with the system having a recirculation capability for diverting at least a selected portion of a flow of pressurized concrete about to enter a supply line back to an open-to-atmosphere reservoir from which the concrete pump draws concrete—so that supply line pressure can be regulated, diminished, relieved or jogged if need be when a clog, blockage or other supply line concern is noted. The system provides a safe way to relieve supply line pressure and to deal with supply line concerns without any need to waste valuable mixed concrete by discharging it into the environment, and without having to dangerously open a highly pressurized supply line connection.

Vehicles often called "concrete trucks" are used to deliver mixed concrete to the vicinity of a work site where the mixed concrete is to be poured so structures such as foundations, footings, floors, slabs and the like can be formed. Pumping equipment carried on trailers or on self-propelled vehicles often called "pumpers" deliver pressurized flows of concrete from hoppers (supplied with concrete by concrete trucks) through typically lengthy supply lines that duct the pressurized flows to specific work site locations where skilled concrete workers move the flexible hoses from place to place to control how and where concrete is poured.

The lengthy supply lines may extend vertically as well as horizontally. Sometimes the supply lines even bridge over the roof of a house, and often the supply lines are tasked to reach to the upper floors of high-rise buildings. The workers who direct the flows of concrete from the delivery ends of supply line hoses typically communicate by radio or by portable phone with pumper vehicle personnel who control the supply of pressurized mixed concrete to the supply lines.

When a clog, blockage or other supply line concern is detected, one prior art proposal calls for a so-called "discharge valve" or "pressure relief valve" to be manually opened to the environment. This causes an immediate and forceful discharge of pressurized concrete that is not only ridiculously wasteful of mixed, ready-to-pour concrete, but also creates a considerable mess that needs to be cleaned up before the concrete sets. More importantly, manually opening a discharge valve to empty the contents of a high pressure supply line can seriously endanger personnel who are working in the vicinity of where the valve has been opened.

Sometimes the pumper operator is the person who must take on the unpleasant task of standing adjacent the pressurized supply line while he struggles to manually turn a threaded T-handle through the many revolutions needed to fully open the discharge valve. This can subject the operator to a nasty splatter of gritty concrete, and can sometimes cause the operator to be pelted with rapidly discharging aggregate while concrete flung by spats of pressure piles up about his shoes or boots. During this discharge of concrete, the operator must continue to inquire, by radio or telephone, whether the wasteful discharge of concrete must continue or can be terminated. When word is received that the wasteful discharge of concrete is to stop, the valve member (that was opened with some difficulty), now must be closed—even though the valve member is now laden with, if not completely buried in, concrete that continues to discharge, but at a slower pace—and must be wiped clean enough to be moved back into some semblance of closure with the supply line opening that previously had been sealed by the valve member.

Before the notion of providing the supply line of a concrete pumper with a so-called "drain valve" was conceived, the approach that previously had been taken to relieve supply line blockages was to open one of the many pipe-to-pipe or pipe-to-hose connections that are present in a lengthy supply line. Usually the connection that is quickly selected to be opened is at a distance spaced from the pumper vehicle so that any resulting powerful discharges of pressurized concrete from an opened connection will not coat the pumper vehicle, or other vehicles that hopefully are parked sufficiently far away from the opened connection to avoid being damaged.

Opening a connection in a highly pressurized supply line filled with concrete presents a more serious and dangerous problem than construction workers (who may rush to assist) can be expected to anticipate. The sudden discharge of pressurized concrete from an opened supply line connection is almost always a violent event not to be forgotten. It is the sort of event that can, and often does, cause lengthy sections of supply line pipe filled with heavy concrete to jump and thud about like angry battering rams, while the lighter-weight connector clamps that have been released when connections are opened are sometimes launched wildly into the air, sometimes impacting vehicles parked a reasonable distance from the pumper, or personnel who may be standing by, more closely.

Sprays of concrete from the just-opened connections of pressurized supply lines are have been known to splatter and coat trees, other plants, sidewalks, construction equipment—and, sometimes the nicely painted and finished surfaces of recently built structures. The the clean-up of whatever kind of sometimes enormous mess that may have been may have resulted from the opening of even one pressurized supply line connection sometimes has to wait while injured personnel are attended.

If a supply line connection has been opened in an effort to find and relieve a clog or blockage, it is essential to keep in mind that the supply line pipes and hoses must be put back into service as quickly as possible—or must be cleared quickly of ready-to-set concrete, for, if the ready-to-set concrete is stagnantly retained in supply line pipes and hoses for any appreciable length of time, the concrete will set in almost no time at all as the supply lines bake in the afternoon sun. Time passes rapidly at job sites where urgent attention is being paid to matters that must be addressed without delay—and, concrete-filled supply line pipes and hoses baking quietly in the sun are easy to detrimentally ignore.

A shortcoming of all prior proposals for dealing with supply line clogs and blockages has been that no effective method or means has been developed or offered that permits supply line pressure to be cycled or jogged up and down—even though rapid changes in supply line pressure are known to sometimes be of help in quickly relieving or breaking up clogs and blockages. Trying to turn concrete pumps off and on has not proved to provide an effective way to rapidly modify supply line pressure in a manner that is useful in dealing with clogs and blockages. A better approach has long been needed.

Likewise, no method or means has been forthcoming for sensibly salvaging the ready-to-set concrete that has been cleared from supply line pipes and hoses. Although avoiding supply line clogs and blockages has always been an objective during use of a concrete pumper, no one knows precisely how to accomplish this laudable objective in a reliable and foolproof manner.

SUMMARY OF THE INVENTION

The present invention addresses the need that unquestionably exists to provide a safe method and means for dealing with supply line clogs, blockages and such other concerns as are encountered when lengthy supply lines are ducting pressurized concrete from a pumper to work site locations where the concrete is being poured.

A significant feature of the system of the present invention is that it does not call for any pressurized supply line connection to be opened; nor does the system of the present invention call for any mixed concrete to be discharged onto the ground or into the atmosphere—so environmental damage, and the wasting of costly mixed concrete are nearly nonexistent. Mixed concrete in a pressurized flow that has not already been ducted under pressure into a lengthy supply line is advantageously recirculated to the open-to-atmosphere hopper or reservoir from which mixed concrete was originally withdrawn and fed to a concrete pump.

The present invention also addresses the need for supply line pressure to be conveniently and effectively regulated, diminished, cycled or jogged during attempts to deal quickly and easily with clogs, blockages and the like such as may occur from time to time when pressurized concrete is being fed to a supply line from a concrete pumper. A diverter valve having a valve seat that is spaced from a primary flow path (along which mixed concrete is being delivered to the supply line) can be cycled repeatedly, and with desired rapidity, to break up clogs and blockages, or to cycle and jog supply line pressure to accomplish other ends—which often is all that is needed to relieve clogs, blockages and the like that sometimes occur in lengthy supply lines where ready-to-pour mixed concrete is being delivered under pressure to work sites where the concrete is being poured, often about as fast as it can be delivered.

In some embodiments of the invention, a recirculation system taps a normal flow path being followed by mixed concrete being ducted under pressure to a lengthy supply line after the mixed concrete has been withdrawn from an open-to-atmosphere reservoir. A recirculation flow path branches from the normal flow path, and extends through a diverter valve typically spaced a short distance from the normal flow path. Pressurized concrete that has not yet entered the lengthy supply line is diverted by the valve and is recirculated back to the open-to-atmosphere reservoir where the recirculated concrete mixes with other ready-to-pour concrete that soon will be pumped under pressure to and through the supply line. By keeping the ready-to-pour mixed concrete recirculating in this way, the ready-to-pour concrete is kept viable while supply line concerns or other issues are being addressed.

In some embodiments, at least a selected portion of a flow of mixed concrete that is being fed under pressure along a primary or normal flow path to a lengthy supply line is diverted from the primary or normal flow path by a diverter valve having a valve seat spaced from the primary or normal flow path. The diverted concrete is returned along a recirculation flow path back to an open-to-atmosphere reservoir from which the concrete was originally supplied a concrete pump. In preferred practice, the diverter valve is hydraulically opened and closed, and can be fairly rapidly cycled to jog the pressure of the mixed concrete contained in the supply line to aid in dealing with clogs, blockages and the like. Or, just as quickly, the feed of pressurized concrete to a supply line can be redirected and diverted back to a hopper or to some other open-to-atmosphere reservoir where the flow of concrete may have begun.

In some embodiments, a tee fitting is interposed between sections of conduit leading to a lengthy supply line—with the normal primary flow of concrete to the supply line not being diminished by the inserted tee fitting because the primary flow path to the supply line goes straight through the tee fitting without interruption. Only when a diverter valve spaced from the primary flow path is opened is supply line pressure altered, and this is done quickly and cleanly, in a way that can prove helpful in dealing with clogs, blockages and other supply line concerns.

In some embodiments, a rounded end of the plunger of a novel diverter valve is provided with a long cap screw that extends back toward a primary flow path along which pressurized concrete is being fed to a supply line. The cap screw can cause a certain amount of useful turbulence (at the entry to a recirculation flow path) that can serve to clear a buildup of stagnant concrete at the entrance to the recirculation flow path that leads to a diverter valve—all of which has been developed during careful testing that has led to the design of a uniquely constructed diverter valve.

In some embodiments, a diverter valve plunger having a semispherical forward end region has been shown to lengthen service life longevity when used with a concrete pumping system having a recirculation capability. Service life longevity also has been enhanced by admitting diverted concrete to a chamber (that houses the plunger) before ducting the diverted concrete into a recirculation conduit or hose—which is not an approach that might be tried by those who are familiar with the regulation and control of abrasive flows.

Another aspect of the invention relates to a method and a kit of components that permit existing concrete pumpers to be retrofitted and upgraded to give them a much needed capability to recirculate pressurized concrete (not yet ducted into a lengthy supply line) to an open-to-atmosphere reservoir—as a safe way to modify supply line pressure—so supply line pressure can be diminished, relieved, jogged, cycled and restarted—all without having to open any connections in highly pressurized supply line pipes and hoses, and without needing to wastefully discharge and discard large quantities of ready-to-pour concrete.

BRIEF DESCRIPTION OF THE DRAWINGS

These, and other features and advantages of concrete pumping systems and diverter valves for use with recirculation systems such as are disclosed herein will become apparent from the description and claims that follow, taken together with the accompanying drawings, wherein:

DETAILED DESCRIPTION

Figure 1:
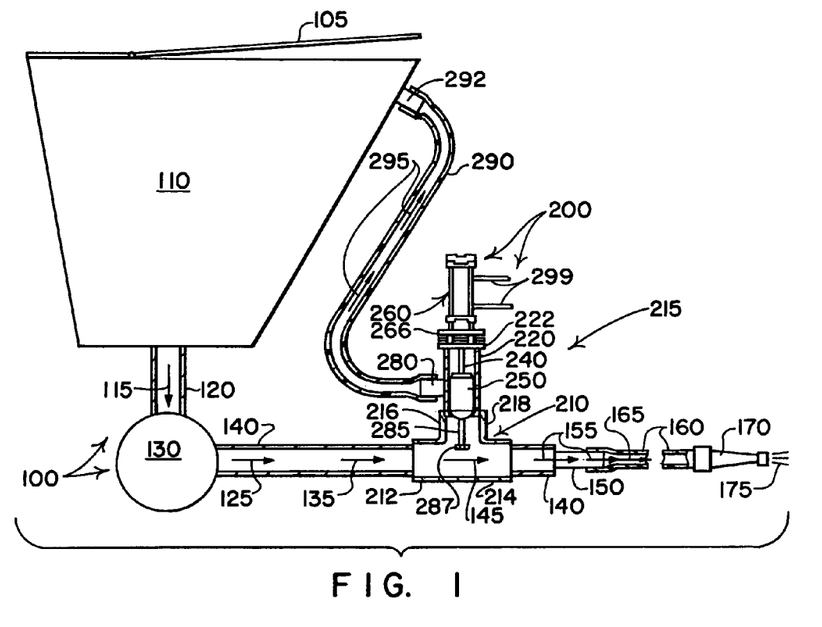
FIG. 1 is a simplified schematic depiction of a combination of conventional components of a present-day concrete pumping system to which has been added a set of recirculation system components (that can be provided as a conversion kit) to improve the safety of operation and to enhance the productivity of present-day concrete pumping systems, with FIG. 1 not showing some of the details of components that are shown in the enlarged cross-sectional view of FIG. 3.

Referring to FIG. 1, some of the major components of a conventional concrete pumping system are shown in a schematic and simplified way—with the conventional concrete pumping system components being designated generally by the numeral 100. The depicted conventional components include a hopper 110, an inlet conduit 120 that ducts mixed concrete from the hopper 110 to a concrete pump 130, and an outlet conduit 140 that ducts mixed concrete under pressure to a series of supply line pipes 150 and hoses 160, and then to a nozzle 170 from which a spray of concrete emanates.

In FIG. 1, the flow of mixed concrete from the hopper 110 through the inlet conduit 120 to the concrete pump 130 is indicated by an arrow 115. The flow of pressurized mixed concrete from the concrete pump 130 through the outlet conduit 140 to a reduced diameter supply line pipe 150 and hose 160 is progressively indicated by arrows 125, 135, 145, 155. Part of the just-mentioned flow of pressurized concrete will be referred to later herein as a "primary flow" which will be said to be moving along a so-called "primary flow path." Both the so-called "primary flow" and the "primary flow path" are indicated by the numeral sequence 125, 135, 145.

A continuation of the so-called primary flow of pressurized mixed concrete is fed to and through one of more lengths of the supply line pipe (designated by the numeral 150), and to one or more reaches of supply line hose (designated by the numeral 160). Flow through the supply line pipe(s) 150 is indicated by the arrow 155. Flow through the supply line hose(s) is indicated by the arrow 165. A discharge of mixed concrete through the nozzle 170 is indicated by the numeral 175.

The hopper 110 shown in FIG. 1 may, or may not, be provided with one or a plurality of hinged lids 105. Whether the hopper 110 has one or more lids 105 makes no difference with regard to the fact that the hopper 110 constitutes what properly can be called a "reservoir" that is open to the atmosphere—which is to say that any mixed concrete that is delivered to, contained in, or fed from the hopper 110 is subjected merely to atmospheric pressure, and is not otherwise pressurized.

The components of the concrete pumping system 100 (namely the hopper 110, the concrete pump 130, the inlet and outlet conduits 120, 140, the supply line pipe and hose components 150, 160, and the nozzle 170) are intended to schematically represent a simple, conventional, concrete pumping system 100 (which also can include other components, not shown). Such other components as are shown in FIG. 1 provide a recirculation system 200 that embodies features of the present invention.

A significant feature of the recirculation system 200 of the present invention is that it can be used to retrofit or upgrade most existing, present-day concrete pumping systems to provide these existing systems with a recirculation capability that adds measurably to the convenience and safety with which existing concrete pumping systems can be operated, and adds substantially to the value and productivity of existing systems 100. As those skilled in the art will recognize, the relatively low cost of adding a reliable recirculation capability to an existing concrete pumping system will quickly pay for itself when and if it eliminates only a few of the kinds of truly catastrophic occurrences that can result from having to open pressurized supply line connections.

Referring still to FIG. 1, a recirculation system 200 embodying features of the present invention includes such components as are utilized to divert a controlled portion of the primary flow 125, 135, 145 (of the pumping system 100) along a recirculation flow path that extends from a branch line or branch conduit 218 of a tee fitting 210, through a diverter valve 215 and a recirculation hose 290 back to the hopper 110 from which the concrete pump 100 draws mixed concrete. The diverted flow is represented by the arrows 295 that show the flow through the recirculation hose 290. When returned to the hopper 110, the recirculation flow of concrete simply mixes with such other ready-to-pour concrete as may be contained within the hopper 100, whereafter ready-to-pour concrete from the hopper 110 is again drawn into the concrete pump 130 where it is pressurized and sent on its way along the primary flow path 125, 135, 145—and so on.

A significant advantage provided by the recirculation system 200 of the present invention is that, in many instances, the recirculation system 200 actually may not need to be put to use at all—for, if the conventional components (designated by numerals shown in FIG. 1 that have a value less than 200) of the system 100 are performing splendidly—as they sometimes do—there is no pressing need to establish a recirculation flow as described in the paragraph just above. However, if operation of the conventional system 100 begins to develop supply line clogs or blockages, or raises other supply line concerns, the diverter valve 215 can be put to use to recirculate a portion of the primary flow 125, 135, 145—or to jog or cycle supply line pressure, or to fully divert the primary flow 125, 135, 145 through the diverter valve 115 and back to the hopper 110—so supply line 150/160 pressure can be diminished or modified in desired ways.

One approach that can be tried (when the recirculation system 200 is at hand and can be utilized in an effort to deal with clogs, blockages and other concerns) is to open and close the diverter valve 215 occasionally—or, with greater rapidity, to jog or cycle supply line pressure up and down while the primary flow to the supply line pipes 150 and hoses 160 continues—which can sometimes break up small clogs before they become larger clogs or blockages. If a serious clog or blockage or other worrisome concern develops, the diverter valve 215 can be fully opened to significantly diminish or greatly relieve supply line 150/160 pressure by causing essentially the entire pressurized flow from the concrete pump 130 to be recirculated through the diverter valve 215 and back into the hopper 110. Some pressure will be maintained in the supply line 150/160 when the diverter valve 215 is fully opened, but the diminished supply line pressure will permit a far safer opening of one or more supply line connections (if need be) than was previously possible when the supply line 150/160 may have been under enormous pressure.

Figure 3:
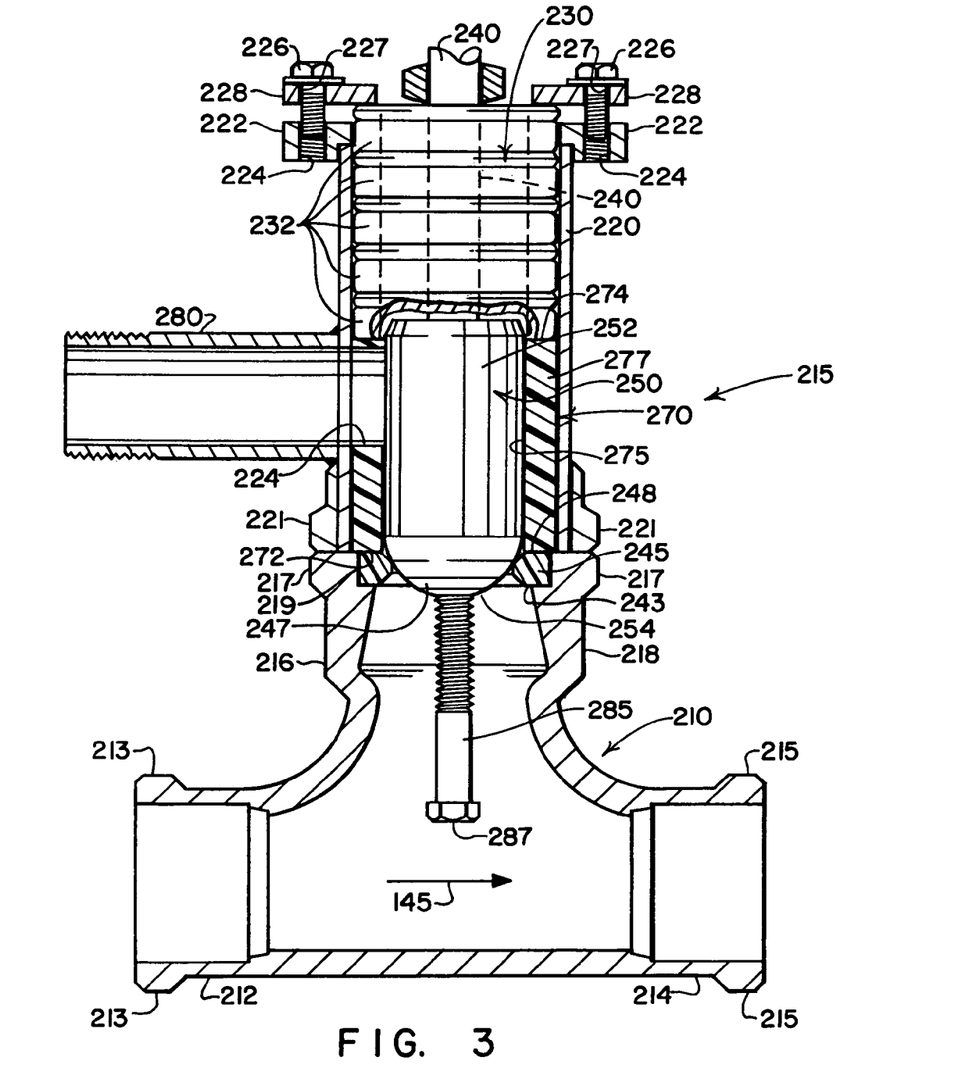
FIG. 3 is a cross-sectional view showing on an additionally enlarged scale, interior components of the tee fitting and of the branch conduit extension that is positioned atop the tee-fitting, with the view showing assembled components of the diverter valve; and, FIG. 4 is a exploded perspective view showing, on a additionally enlarged scale, selected components of the novel diverter valve that incorporates some of the features of the invention.

Turning to FIG. 3, the recirculation system 200 preferably includes a tee fitting 210 that is interposed between severed or separated lengths of the outlet conduit 140. Interposing the tee fitting 210 between severed or separated lengths of the outlet conduit 140 does little to disrupt the flow of mixed concrete under pressure from the concrete pump 130 to the supply line pipes 150 and hoses 160. This is because the tee fitting 210 is oriented so that the substantially continuous primary flow 125, 135, 145 of pressurized mixed concrete from the concrete pump 130 to the supply line pipes 150 and hoses 160 moves in a straight-line manner traveling without obstruction into the inlet port 212 of the tee fitting 210, and straight out the outlet port 214 of the tee fitting 210.

Referring to FIG. 3, the tee fitting 210 has a branch line or branch conduit 218 leading to a branch port 216. The interior of the tee fitting 210 communicates the inlet and outlet ports 212, 214, respectively, with the branch port 216. So long as the branch port 216 remains closed (by the diverter valve 215), the primary flow 125, 135 is not interrupted—except for a small amount of mixed concrete that may divert into the branch line or branch conduit 218 of the tee fitting 210. Concrete entering the branch line 218 can form something of a stagnant mass in the vicinity of an annular valve seat 245 that is pressed into a machined recess 219 at the end of the branch line 218 (as is shown in FIG. 3).

Figure 2:
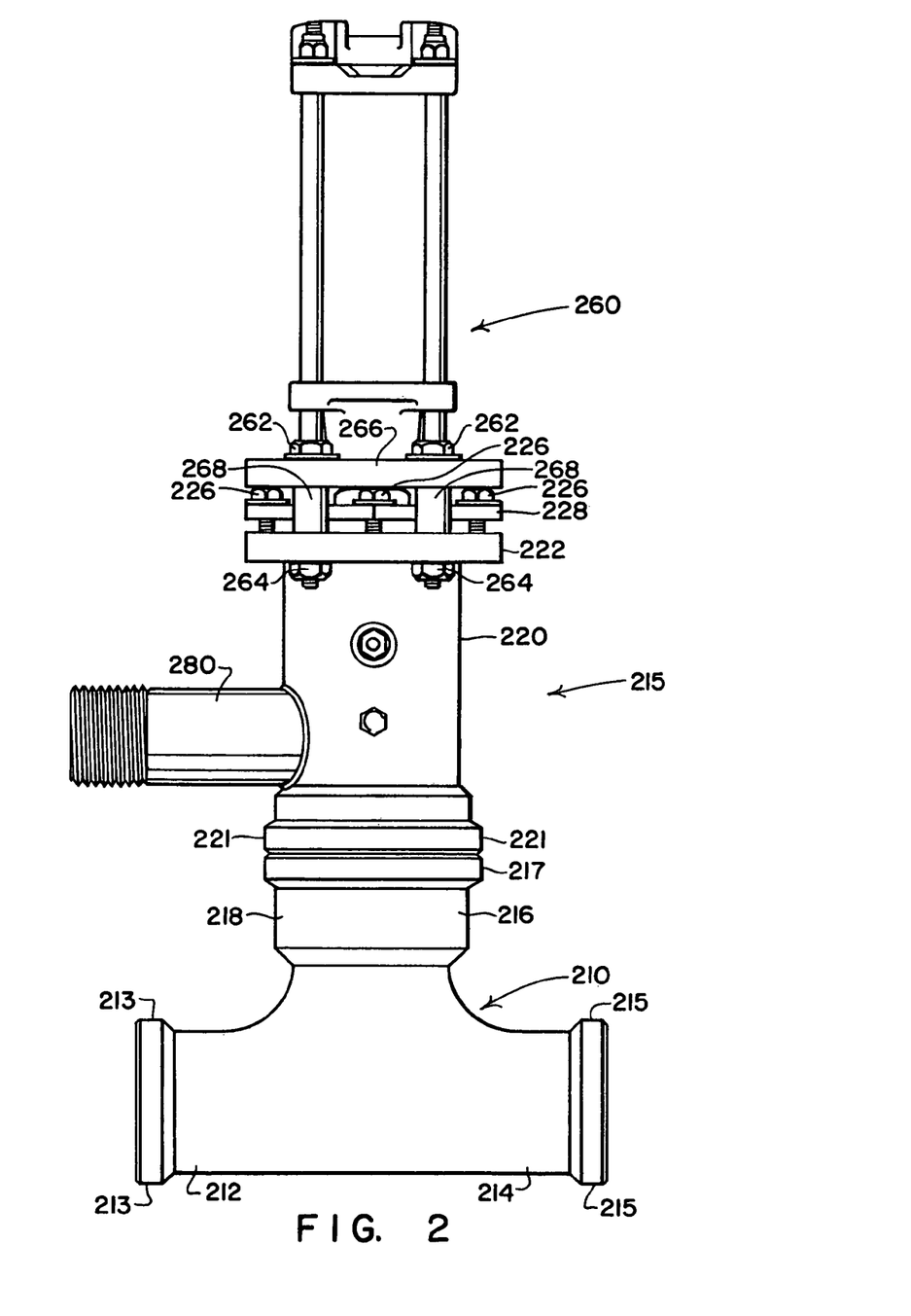
FIG. 2 is a front view, showing on an enlarged scale, many of the components of the recirculation system of the present invention including a tee fitting having a branch line or branch conduit that ducts concrete to a diverter valve, and a branch conduit extension that houses major components of the diverter valve, with the view also showing a hydraulic cylinder that operates the diverter valve.

Referring to FIG. 2, the tee fitting 210 has flanges 213, 215 and 217 that encircle the ports 212, 214, 216, respectively. The flanges 213, 215, 217 are configured to be releasably connected to associated flange formations provided on such piping as is joined to the tee fitting 210. For example, a pipe or branch conduit extension 220 (shown in FIGS. 1-3) extends upwardly from the branch line 218 of the tee fitting 210—and the pipe or branch conduit extension 220 has a flange 221 that rests atop the flange 217 of the tee fitting 210 so that a conventional releasable clamp (not shown) can be installed to hold the adjacent flanges 217, 221 together to provide a leak-free connection therebetween.

Referring to FIG. 3, the upwardly extending length of pipe or branch conduit extension 220 has a relatively thick plate 222 welded to its upper end. The plate 222 has threaded holes 224 formed therethrough into which are threaded cap screws 226 that extend through holes 227 formed through a thinner plate 228 that overlies portions of a cavity 230 defined by the interior of the upstanding pipe or conduit 220. A set of five annular packings 232 lines approximately the upper half of the cavity 230. By tightening the cap screws 226, the thinner plate 228 is pressed toward the thick plate 222, causing the set of annular packings 232 to be compressed downwardly to more tightly seal about a plunger 250 of the valve 215 that can move through the open central region of the packings 232 when the valve plunger 250 is raised by a piston rod 240 to which the plunger 250 is attached.

Referring to FIG. 2, a conventional hydraulic cylinder 260 is mounted atop the thick and thinner plates 222, 228, respectively, by cap screws 262 and nuts 264. The hydraulic cylinder 260 has a relatively thick mounting plate 266 near its lower end—and the cap screws 262 extend through aligned holes (not shown) in the thick plates 222, 266, and through bushings 268 that are interposed between the thick plates 222, 226. By this arrangement, the hydraulic cylinder 260 is securely connected to the pipe or conduit 220.

The hydraulic cylinder 260 receives and exhausts hydraulic fluid through two hoses 299 that are shown in FIG. 1. The hoses 299 connect in a conventional manner with suitable hydraulic controls (not shown) and a conventional source of pressurized hydraulic fluid (not shown). When the hydraulic cylinder 260 is operated by hydraulic fluid under pressure, the piston rod 240 extends through aligned central openings that are formed through the several plates 226, 228 and 222, and causes the plunger 250 to move toward and away from the annular valve seat 245 (best shown in FIG. 4).

Figure 4:
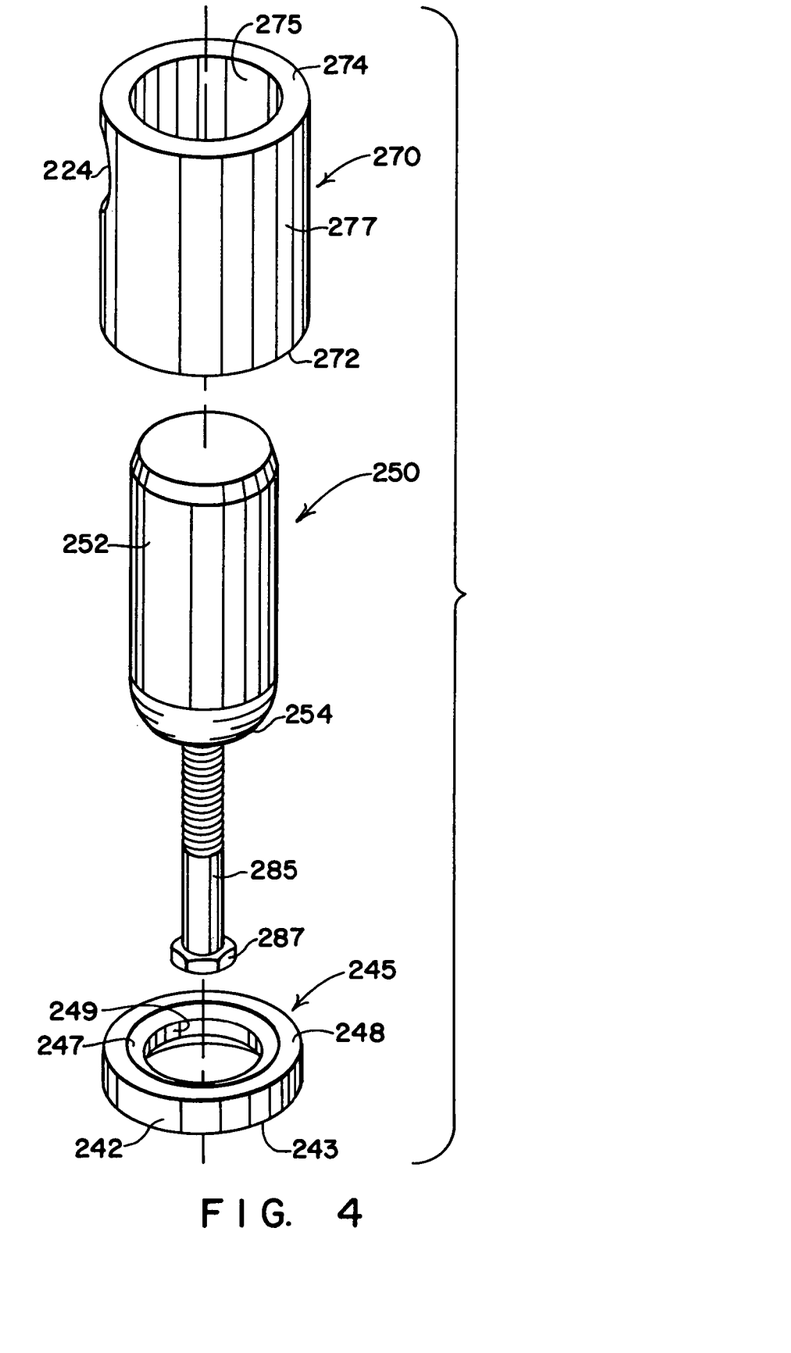

Referring to FIG. 4, the plunger 250 has a cylindrical outer wall 252 that connects smoothly with a semispherical (in the shape of half a sphere) bottom wall 254. As the cylindrical outer wall 252 of the plunger 250 moves up and down along the cylindrical interior 275 of the sleeve 270, The plunger 250 sealingly engages the interior 275 of the sleeve 270 so that such concrete as is admitted to the interior 275 of the sleeve 270 through the opening 249 of the valve seat 245 does not leak around the plunger 250.

Referring still to FIG. 4, the sleeve 270 has a cylindrical outer sidewall 277 that extends between planar annular top and bottom surfaces 274, 272, respectively. The annular valve seat has a cylindrical outer wall 242 that extends between planar top and bottom walls 248, 243, respectively. A rounded or frustoconical wall 247 provides a surface that is engaged by the semispherical or rounded bottom surface 254 of the plunger 250 when the plunger 250 is lowered into engagement with the valve seat 245 by the piston rod 240 of the hydraulic cylinder 260.

As can be seen in FIGS. 3 and 4, a cylindrical, transversely extending passage 224 is formed through a sidewall of the sleeve 270. The passage 224 serves to communicate the cylindrical interior 275 of the sleeve 270 with a recirculation pipe 280 that is welded to the exterior of the upstanding pipe or conduit 220.

The plunger 250 is preferably made of metal. The cylindrical outer surface 252 of the plunger 250 is polished so the plunger 250 will move smoothly and without much friction through the interior 275 of the sleeve 270. When the plunger 250 has its rounded semispherical lower end region 254 in sealing engagement with the valve seat 245, the cylindrical outer surface 252 of the plunger 250 has moved sufficiently downwardly through the interior 275 of the sleeve 270 that the outer wall 252 of the plunger 250 completely closes the transverse passage 224 formed through a side wall of the sleeve 270. When the plunger 250 is moved upwardly, the cylindrical outer surface 252 of the plunger eventually no longer closes the passage 224, so concrete that has passed from the branch conduit 218 through the opening 249 of the valve seat 245 and into the interior of the sleeve 270 is permitted to discharge through the passage 224 and into the recirculation pipe 280 that is welded to the exterior of the upstanding pipe or conduit 220.

Referring once again to FIG. 1, a recirculation hose or recirculation conduit 290 extends from the recirculation pipe 280 to a short conduit 292 that opens into the hopper 110. What the recirculation hose or recirculation conduit 290 permits is for a diverted part of the primary flow 125, 135, 145 to move through the opening 249 of the valve seat 245, through the sleeve 270 and the sleeve-defined passage 224, through the recirculation pipe 280, through the recirculation conduit or hose 290, and through the short conduit 292 back into the hopper 110. This recirculation flow is represented by the arrows 295 in FIG. 1.

As those who are skilled in the art will readily recognize, the diverter valve 215 shown in FIGS. 1-3 is not an off-the-shelf commercially available product. Not just any valve will perform as is needed to selectively permit and prevent a pressurized flow of gritty, aggregate-filled mixed concrete to be repeatedly and reliably turned off and on so the pressure that mixed concrete applies to concrete in the supply line pipes 150 and hoses 160 can be regulated, jogged off and on, and turned off completely—all without having to break open any supply line connection, and without having to open any sort of discharge valve to dump valuable mixed concrete on the ground, or cause it to spray into the air.

The rounded, semispherical lower end region 254 of the plunger 250 which engagingly seals with the valve seat opening 249 (defined by the rounded or frustoconical surface 247 of the valve seat 245) has taken time to develop and test, and to ensure its reliability. Positioning the transversely extending passage 224 of the sleeve 270 at a distance spaced from the valve seat 245 (so the flow of concrete enters the central interior region 275 of the annular sleeve 270 before being ducted through the passage 224 of the sleeve 270), took time and testing to develop into a reliable and long-lasting means for admitting the diverted portion 295 of the primary flow 135, 145, 155 to the recirculation hose 290.

The small delay experienced by diverted concrete during its passage from the valve seat 245 to the passage 224 is small, but seems useful in getting the recirculation system 200 to behave in a desirable manner. When the recirculation flow is terminated, the plunger 250 presses concrete from the interior of the sleeve 270 back through the valve seat 245 so the plunger 250 can engage the valve seat 245. This sudden backward flow of a small quantity of the diverted concrete can cause a quick spike in supply line pressure—which may be just enough to cause a supply line clog to be relieved.

Yet another feature of the preferred practice of the present invention that has taken time to develop and test is the use of a lengthy cap screw 285 that is threaded into an opening at the center of the rounded, semispherical end region 287 of the plunger 250. When the plunger 250 is seated in sealing engagement with the valve seat 245, a hex head 287 of the cap screw 285 (i.e., what is referred to in the claims as "an enlarged part of a depending formation of relatively small cross-section," namely the cap screw 285) is positioned (by the chosen length of the cap screw 285) to be quite near to, or extending a short distance into, the primary flow 125, 135, 145. The head 287 of the cap screw 285 can cause a small amount of beneficial turbulence to occur in the vicinity of the head 287—which can help to minimize the size of any stagnant amount of concrete that diverts from the primary flow into the branch line 218 of the tee fitting 210.

When the plunger 250 is moved upwardly away from the valve seat 245, the head 287 of the cap screw 285 is pulled upwardly in unison with the plunger being pulled upwardly by the piston rod 240. This movement of the cap screw 285 and its head 287 will quickly break up and start the removal of any stagnant mass of concrete that may have accumulated in the branch line 218 of the tee fitting 210.

As mentioned previously, such components as form the recirculation system 200 can be supplied as a conversion kit that permits existing, present-day concrete pumping systems (represented by components of the system 100) to be upgraded or retrofitted with a recirculation capability.

An advantage provided by the recirculation system 200 is that, if conventional components of the concrete pumping system 100 are experiencing supply line clogs, blockages or other concerns, the recirculation system 200 can be brought into operation to enable the pressure of concrete being fed to the supply line 150/160 to be modified, diminished, jogged or cycled by the extent to which, and the rapidity of which the diverter valve 215 is opened and closed. Supply line pressure diminishes as the diverter valve 215 is progressively opened; and, supply line pressure can be jogged or cycled differently by opening and closing the diverter valve 215 at differing frequencies and to different extents—which lets any experienced operator quickly determine how best a particular concrete pumping system will behave best once the recirculation system of the present invention added.

Although the invention has been described in its preferred form with a certain degree of particularity, it is understood that the present disclosure of the preferred form has been made only by way of example, and that numerous changes in the details of construction and the combination and arrangement of parts may be resorted to without departing from the spirit and scope of the invention. It is intended that the claims that follow address such patentable features as are disclosed herein.

What is claimed is:

1. A concrete pumping system that provides for recirculation of pumped concrete, comprising:
   a) a hopper providing a reservoir configured to receive and contain a quantity of mixed concrete from a source of mixed concrete, and defining a reservoir of the mixed concrete that is in communication with the atmosphere;
   b) a concrete pump in communication with the hopper for pressurizing mixed concrete received from the hopper;
   c) a primary conduit in communication with the concrete pump for ducting pressurized concrete received from the concrete pump along a primary flow path to where a supply line is or can be connected that is configured to deliver concrete to where the concrete is needed, with the primary conduit and the primary flow path extending substantially horizontally;
   d) a branch conduit in communication with the primary conduit and extending away from the primary flow path for receiving such concrete as may be diverted from the primary flow path, with the branch conduit extending substantially vertically;
   e) a branch conduit extension that extends farther from the primary flow path than does the branch conduit, with the branch conduit extension extending substantially vertically;
   f) a valve seat interposed between the branch conduit and the branch conduit extension, with one side of the valve seat being in communication with the branch conduit, and an opposite side of the valve seat being in communication with the branch conduit extension;
   g) a plunger in the branch conduit extension that is movable along a substantially vertical path of movement into and out of sealing engagement with the valve seat, with the plunger being operable when moved upwardly out of sealing engagement with the valve seat to permit concrete to flow from the branch conduit into the extension of the branch conduit, and with the plunger having a rounded, substantially half-spherical end region that engages an upwardly-opening portion of the valve seat when moved downwardly into sealing engagement with the valve seat;
   h) a recirculation conduit in communication with the branch conduit extension, in communication with the hopper, and configured to duct concrete from the branch conduit extension into the hopper;
   i) a hydraulic cylinder having a piston connected to the plunger for moving the plunger into and out of sealing engagement with the valve seat; and
   j) an elongate member depending, at one end, from the rounded end region of the plunger to define an elongate formation of relatively thin and substantially uniform cross-sectional area, with an enlarged part formed at a depending end region that extends downwardly toward and terminates near to the primary flow path, with the elongate formation being defined by a cap screw threaded into the rounded end region of the plunger, and with the cap screw having a hex head at its lower end to define the enlarged part.

2. The concrete pumping system of claim 1 additionally including at least one hinged lid on the hopper to assist in retaining mixed concrete in the hopper, and with the presence of the lid nonetheless permitting the hopper to communicate with the atmosphere.

3. The concrete pumping system of claim 1 with the length of the cap screw causing the hex head of the cap screw to be located quite near to the primary flow path when the valve seat opening is sealed by the plunger.

4. The concrete pumping system of claim 1 with the primary conduit, the branch conduit and the extension of the branch conduit all being formed from metal.

5. The concrete pumping system of claim 4 with a portion of the recirculation conduit being formed by a flexible but relatively stiff hose.

6. The concrete pumping system of claim 4 with a portion of the primary conduit being defined by a tee fitting having an inlet aligned with an outlet, with the primary flow path extending through the aligned inlet and outlet, and with a branch of the tee fitting defining at least a part of the branch conduit.

7. The concrete pumping system of claim 6 with the branch conduit of the tee fitting extending upwardly to an upper end region of the branch of the tee fitting where the valve seat is stationed.

8. The concrete pumping system of claim 1 with the hydraulic cylinder being capable of relatively quickly moving the plunger into and out of sealing engagement with the valve seat to relatively quickly cycle between permitting and preventing concrete to flow from the branch conduit into the extension of the branch conduit.

9. A diverter valve comprising:
an annular valve seat, wherein:
the valve seat is positioned near a port defined by a branch portion of a tee fitting having aligned inlet and outlet ports;
the alignment of the inlet and outlet ports enables a primary flow path of pressurized concrete to extend through the inlet and outlet ports to enable pressurized concrete to be ducted along the primary flow path from a concrete pump that communicates with the inlet port, through the inlet and outlet ports, and to a lengthy supply line that communicates with the outlet port; and
the valve seat is defined by an annular member formed from plastics material that is resistant to abrasion caused by concrete forming through an opening defined by the valve seat; and
a plunger, wherein:
the plunger is moved by extension and retraction of a piston of a fluid-operated cylinder into and out of sealing engagement with the valve seat to selectively prevent and permit at least a diverted portion of the primary flow of pressurized concrete that enters the tee fitting through the inlet port to pass through the opening defined by the valve seat and into a recirculation hose to enable the diverted portion of the primary flow to be ducted from the opening defined by the valve seat, through the recirculation hose and into a reservoir that communicates with the recirculation hose to enable the diverted portion of the primary flow to be supplied to the concrete pump from the reservoir;
the plunger comprises a rounded end region, a portion of which engages and disengages the opening defined by the valve seat when the plunger is moved into and out of engagement with the valve seat; and
the plunger comprises a cap screw threaded into a central part of the rounded end region, with the cap screw having a length that extends through the opening defined by the valve seat when the plunger engages the valve seat.

10. The diverter valve of claim 9 additionally including an elongate sleeve having a tubular sidewall formed from abrasion resistant plastics material that extends into engagement with the annular member that defines the valve seat, with the elongate sleeve having a generally cylindrical interior wall that snugly surrounds and engages the plunger as the plunger moves through the tubular sleeve into and out of engagement with the valve seat.

11. The diverter valve of claim 10 with the elongate sleeve having a transversely extending passage formed through the tubular sidewall of the sleeve at a location spaced from the valve seat, with the passage being configured to duct into the recirculation hose concrete that enters the sleeve through an opening defined by the valve seat.

12. The diverter valve of claim 11 with the plunger being movable along a path of travel that causes the plunger to selectively open and close the passage, and to permit and prevent concrete entering the sleeve through the opening defined by the valve seat.

13. The diverter valve of claim 9 with the cap screw having a length that, when the plunger engages the valve seat, positions a hex head of the cap screw near where concrete flows along the primary flow path while moving through the tee fitting from the inlet port to the outlet port.

14. The diverter valve of claim 9 additionally including a hydraulic cylinder having a piston connected to the plunger for moving the plunger into and out of sealing engagement with the valve seat.

15. The diverter valve of claim 14 with the hydraulic cylinder being capable of relatively quickly moving the plunger into and out of sealing engagement with the valve seat to relatively quickly cycle the diverter valve between permitting and preventing the diverted portion of the primary flow from being ducted through the recirculation hose.

16. A recirculation apparatus for connection to a primary conduit through which a primary flow of pressurized concrete from a concrete pump is fed to a lengthy supply line, comprising:
a) a tee fitting to be inserted between separated parts of the primary conduit so that the primary flow of pressurized concrete is caused to flow along a new primary flow path that extends through substantially aligned and communicating inlet and outlet ports of the tee fitting while being fed to the lengthy supply line;
b) with the tee fitting also having a branch conduit that communicates with the new primary flow path, and into which branch conduit at least a portion of the pressurized concrete entering the tee fitting through the inlet port can divert to one side of a valve seat carried by the branch conduit at a distance spaced from the new primary flow path;
c) with the opposite side of the valve seat being in communication with a recirculation conduit that also communicates with an open-to-atmosphere reservoir from which concrete is drawn by the concrete pump to provide the flow of pressurized concrete;
d) a hydraulically operated plunger located on the opposite side of the valve seat that is movable into and out of engagement with the valve seat to open and close an opening defined by the valve seat to selectively permit and prevent concrete near the one side of the valve seat to move through the opening defined by the valve seat into the recirculation conduit and into the reservoir; and e) an elongate formation of relatively thin and substantially uniform cross-sectional area that is connected to and extends from the plunger at one end, and having an enlarged part formed at an opposite end that extends towards the tee fitting, wherein the opposite end extends through the opening defined by the valve seat and into the primary flow of the pressurized concrete when the plunger is moved into engagement with the valve seat to enable the enlarged part to cause an amount of turbulence within the tee fitting to minimize a size of a stagnant amount of pressurized concrete that diverts from the primary flow and into the branch conduit, and wherein the enlarged part is pulled into the branch conduit to enable the enlarged part to break up the stagnant amount of pressurized concrete when the plunger is moved out of engagement with the valve seat.

17. The recirculation apparatus of claim 16 with the hydraulically operated plunger being capable of being relatively quickly moved into and out of engagement with the valve seat to relatively quickly cycle between permitting and preventing the concrete near the one side of the valve seat to move through the opening defined by the valve seat into the recirculation conduit.

18. The recirculation apparatus of claim 16 additionally including an elongate sleeve having a tubular sidewall formed from abrasion resistant plastics material that extends into engagement with the valve seat, with the elongate sleeve having a generally cylindrical interior wall that snugly surrounds and engages the plunger as the plunger moves through the tubular sleeve into and out of engagement with the valve seat.

19. The recirculation apparatus of claim 18 with the elongate sleeve having a transversely extending passage formed through the tubular sidewall of the sleeve at a location spaced from the valve seat, with the passage being configured to duct into the recirculation conduit concrete that enters the sleeve through the opening defined by the valve seat.

20. The recirculation apparatus of claim 19 with the plunger being movable along a path of travel that causes the plunger to selectively open and close the passage, and to permit and prevent concrete entering the sleeve through the opening defined by the valve seat.

* * * * *